US009479881B2

United States Patent
Kitago et al.

(10) Patent No.: US 9,479,881 B2
(45) Date of Patent: Oct. 25, 2016

(54) WIRELESS COMMUNICATION APPARATUS, WIRELESS COMMUNICATION SYSTEM, AND DATA PROCESSING METHOD

(71) Applicant: Panasonic Intellectual Property Management Co., Ltd., Osaka (JP)

(72) Inventors: Ryosuke Kitago, Fukuoka (JP); Kenji Fukui, Fukuoka (JP); Hirotaka Fukutsuka, Fukuoka (JP); Motoshi Suzuki, Fukuoka (JP); Shouhei Taniguchi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 67 days.

(21) Appl. No.: 14/563,905

(22) Filed: Dec. 8, 2014

(65) Prior Publication Data

US 2015/0172840 A1    Jun. 18, 2015

(30) Foreign Application Priority Data

Dec. 16, 2013 (JP) .................................. 2013-259622

(51) Int. Cl.
| | |
|---|---|
| H04R 27/00 | (2006.01) |
| H04M 1/60 | (2006.01) |
| H04M 1/656 | (2006.01) |
| H04M 9/00 | (2006.01) |
| H04R 1/10 | (2006.01) |

(52) U.S. Cl.
CPC ........... *H04R 27/00* (2013.01); *H04M 1/6041* (2013.01); *H04M 1/6066* (2013.01); *H04M 1/656* (2013.01); *H04M 9/001* (2013.01); *H04M 2250/74* (2013.01); *H04R 1/1008* (2013.01); *H04R 2227/003* (2013.01); *H04R 2420/07* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 8,884,758 B2 | 11/2014 | Taniguchi et al. | |
| 2001/0002467 A1* | 5/2001 | Ogo ........................ | G06Q 20/20 455/41.1 |
| 2002/0143638 A1* | 10/2002 | August .................. | G06Q 20/12 705/14.27 |
| 2003/0021426 A1* | 1/2003 | Oogo ..................... | H04B 1/385 381/93 |
| 2006/0040643 A1* | 2/2006 | O'Connor ....... | H04M 1/274575 455/412.1 |
| 2006/0274166 A1* | 12/2006 | Lee ........................ | G11B 27/10 348/231.99 |

(Continued)

FOREIGN PATENT DOCUMENTS

| | | |
|---|---|---|
| JP | 2012-124546 A | 6/2012 |
| JP | 2013-137755 A | 7/2013 |
| WO | 2011102141 A1 | 8/2011 |

OTHER PUBLICATIONS

Extended European Search Report dated May 4, 2015, for the corresponding EP Application No. 14196829.7-1855, 5 pages.

*Primary Examiner* — Brenda Bernardi
(74) *Attorney, Agent, or Firm* — Seed IP Law Group LLP

(57) ABSTRACT

A wireless communication apparatus which communicates with a first microphone is disclosed, which includes an audio processor which acquires audio data from the first microphone, a controller which detects an instruction for audio recording from the first microphone, an audio recorder which starts recording the audio data and stops the recording after a defined period of time since detection of the instruction for audio recording, a timer which starts measuring time for the defined period of time, and a memory controller which creates a recorded audio file, wherein the recorded audio file is linked to log information.

20 Claims, 9 Drawing Sheets

(56) References Cited

U.S. PATENT DOCUMENTS

| | | |
|---|---|---|
| 2006/0287000 A1 | 12/2006 | Sun |
| 2007/0036330 A1 | 2/2007 | Wagner et al. |
| 2007/0192196 A1* | 8/2007 | Awiszus .................. G06Q 50/12 705/15 |
| 2009/0215502 A1 | 8/2009 | Griffin, Jr. |
| 2012/0078397 A1* | 3/2012 | Lee .......................... G10L 25/78 700/94 |
| 2012/0140747 A1 | 6/2012 | Taniguchi et al. |
| 2012/0306650 A1 | 12/2012 | Taniguchi et al. |
| 2013/0138515 A1 | 5/2013 | Taniguchi et al. |
| 2013/0335640 A1* | 12/2013 | Watanabe ............... G06F 3/017 348/744 |
| 2014/0370855 A1 | 12/2014 | Koss et al. |

* cited by examiner

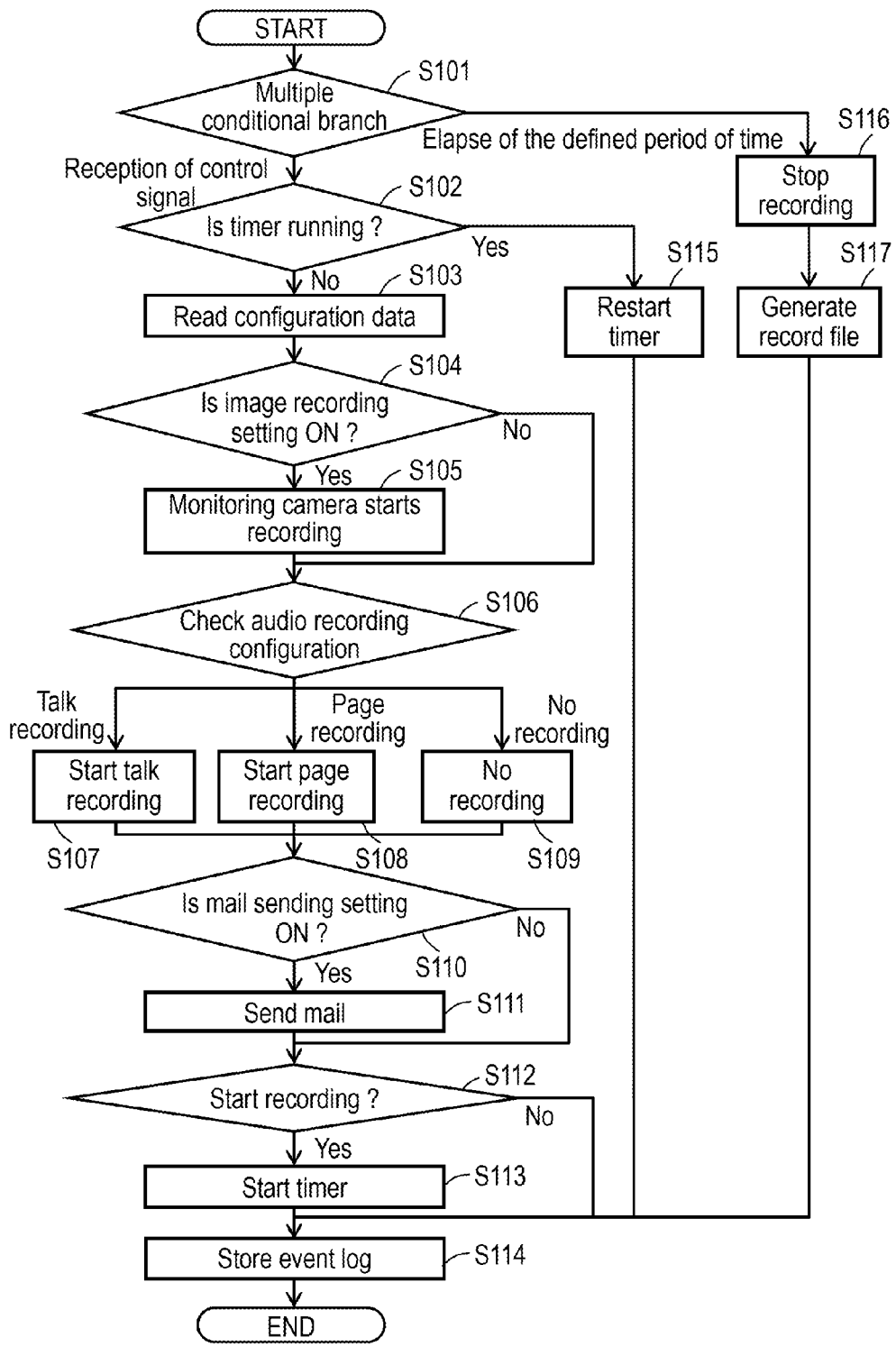

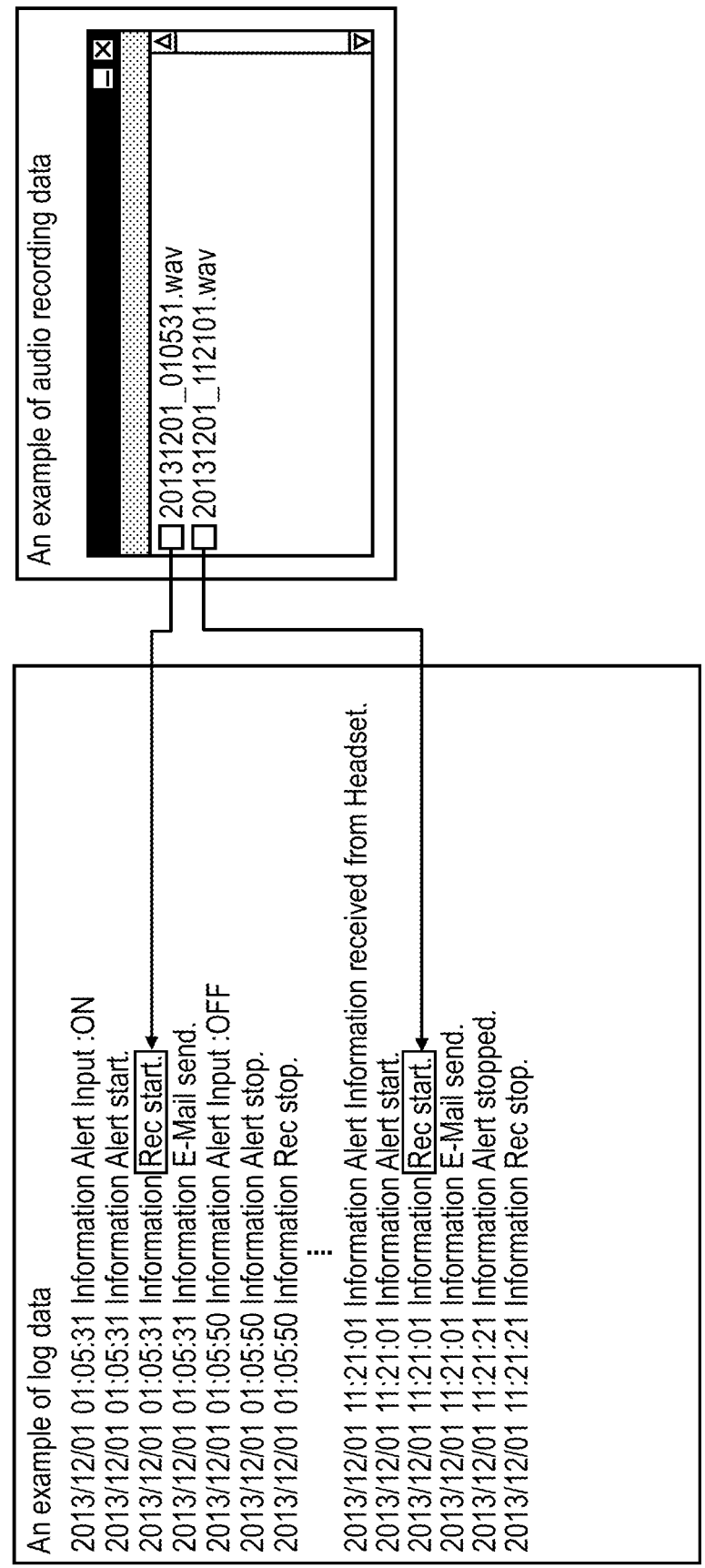

WIRELESS COMMUNICATION APPARATUS, WIRELESS COMMUNICATION SYSTEM, AND DATA PROCESSING METHOD

BACKGROUND

The present invention relates to a wireless communication apparatus, a wireless communication system and a data processing method of the wireless communication apparatus.

An intercom system is known as intra-office audio communication equipment, which is not connected to a public telephone network. The intercom system facilitates a business process in various situations that use hands-free interactive communication.

JP-A-2012-124546 describes a wireless communication system, as an intercom system, which includes a master device and a plurality of slave devices, wherein a transmitting side of a slave device and a receiving side of a slave device wirelessly communicate with each other via the master device. In this wireless communication system, communication by some of the plurality of slave devices is prioritized. The rest of the plurality of slave devices, however, can still perform communication even though communication by some of the plurality of slave devices is prioritized.

JP-A-2013-137755 discloses an order receiving system which starts to prepare a product or a service to be provided to customers according to prescribed timing.

WO 2011/102141 discloses a system which includes a plurality of order receiving devices and an audio communication control device which communicates with each of the plurality of order receiving devices. In this system, an order receiving device notifies the audio communication control device of an event occurrence. The audio communication control device notified of the event occurrence sends a notice of the event occurrence to a certain order receiving device that is selected from the plurality of order receiving devices in advance.

However, in the intercom system of JP-A-2012-124546, JP-A-2012-124546, and WO 2011/102141, it was difficult to confirm a content of past conversation that took place among a plurality of wireless slave devices of the intercom system.

SUMMARY

According to one aspect of the present invention, a wireless communication apparatus, a wireless communication system and a data processing method of the wireless communication apparatus are provided, which may enable to confirm audio which is picked up by a plurality of devices in the past easily.

According to one embodiment, a wireless communication apparatus which communicates with a first microphone comprises an audio processor which acquires audio data from the first microphone and a controller which detects an instruction for audio recording from the first microphone. Also, the wireless communication apparatus comprises an audio recorder which starts recording the audio data from the first microphone acquired by the audio processor according to the instruction for audio recording and stops the recording after a defined period of time since detection of the instruction for audio recording, and a timer which starts measuring time when the audio recorder starts the recording for the defined period of time. Further, the wireless communication apparatus comprises a memory controller which creates a recorded audio file including the audio data recorded by the audio recorder, wherein the recorded audio file is linked to log information of communication between the wireless communication apparatus and the first microphone.

According to another aspect of the present invention, a system comprises a wireless communication apparatus and a wireless communicator, which communicate with each other. The wireless communicator communicates with a first microphone. The wireless communicator includes an actuator which, when activated, instructs start of audio recording and a transmitter which transmits control data including information that the actuator is activated to instruct start of the audio recording. The wireless communication apparatus includes an audio processor which acquires audio data from the first microphone, a receiver which receives the control data from the wireless communicator, and a controller which detects an instruction for audio recording according to the control data. Also, the wireless communicator includes an audio recorder which starts recording the audio data from the first microphone acquired by the audio processor according to the instruction for audio recording and stops recording the audio data after a defined period of time since detection of the instruction for audio recording, a timer which starts measuring time when the audio recorder starts recording the audio data for the defined period of time, and a memory controller which creates a recorded audio file including the audio data recorded by the audio recorder, wherein the recorded audio file is linked to log information of communication between the wireless communication apparatus and the wireless communicator of the first microphone.

According to another aspect of the present invention, a data processing method is provided for operating a wireless communication apparatus which communicates with a first microphone. The method comprises acquiring audio data from the first microphone and detecting an instruction for audio recording from the first microphone. Also the data processing method comprises starting recording the audio data from the first microphone according to the instruction for audio recording, stopping recording the audio data after a defined period of time since detection of the instruction for audio recording, and creating a recorded audio file including the recorded audio data, wherein the recorded audio file is linked to log information of communication between the wireless communication apparatus and the first microphone.

BRIEF DESCRIPTION OF THE DRAWINGS

FIG. 8 is a flowchart showing an example of behavior of a main controller of a master device according to an embodiment of the present disclosure.

FIG. 9 is a schematic view showing an example of log data and a recorded audio data file according to an embodiment of the present disclosure.

DETAILED DESCRIPTION OF EXEMPLARY EMBODIMENTS

An embodiment of the present invention (hereafter referred to as the "present embodiment") will be described with reference to the accompanying drawings.

Figure 1:
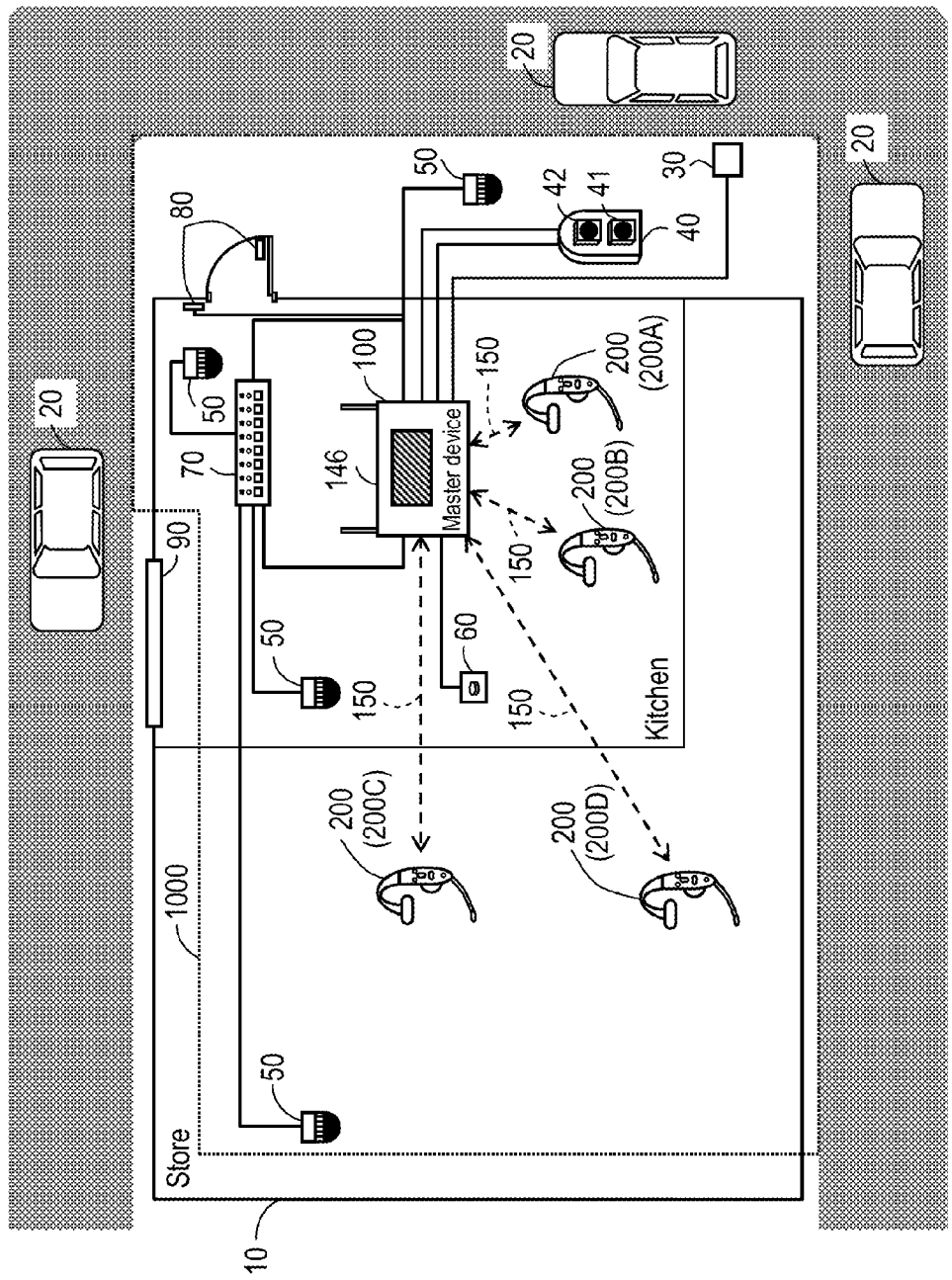
FIG. 1 is a schematic view showing a configuration example of a wireless communication system and an example of a store and its surrounding where the wireless communication system is installed according to an embodiment of the present disclosure.

FIG. 1 is a schematic view showing a configuration example of a wireless communication system 1000 and an example of a store 10 and its surrounding where the wireless communication system 1000 is installed. In FIG. 1, an intercom system which is installed at a drive though store 10 is shown as an example of the wireless communication system 1000. The intercom system is used at, for example, a drive through store, a broadcast station, a concert hall, a multipurpose hall, and a theater.

The store 10 includes, for example, a master device 100, a slave device 200, a vehicle detection sensor 30, an order post 40, a monitoring camera 50, an emergency button 60, a switching hub 70, a door opening detection sensor 80, and a delivery port 90.

The wireless communication system 1000 includes, for example, the master device 100, the slave device 200, the vehicle detection sensor 30, a microphone 41, a speaker 42, the monitoring camera 50, the emergency button 60, the switching hub 70, and the door opening detection sensor 80.

The master device 100 is a communication device which communicates with a plurality of slave devices 200 via a wireless network 150. The master device 100 communicates with the vehicle detection sensor 30, the order post 40, the emergency button 60, the switching hub 70, and the door opening detection sensor 80 and collects various information from devices with which the master device 100 communicates.

The master device 100 includes, for example, a built-in LCD 146 and notifies store staff of necessary information via the built-in LCD 146. The master device 100 may include a microphone and a speaker which are not described in figures. The microphone and the speaker of the master device 100 are connected to the master phone 100 and may be located outside of the master device 100 in a kitchen, for example.

A wireless communication method using the wireless network 150 is, for example, DECT (Digital Enhanced Cordless Telecommunication), wireless LAN (Local Area Network), Bluetooth, or Zigbee.

The slave device 200 is a wireless communicator that communicates with the master device 100, which is a wireless communication apparatus, via the wireless network 150. Identification data of each slave device 200 such as DECT ID and MAC address (Media Access Control Address) is registered in the master device 100. Therefore, the master device 100 can identify each of the plurality of slave devices 200.

For example, a store clerk is provided with the slave device 200 which is user wearable. Therefore, the slave device 200 may be moved in the inside and the neighborhood of the store.

The vehicle detection sensor 30 is, for example, a publicly known sensor which detects a vehicle 30 with a customer who comes to the store 10. The vehicle detection sensor 30 detects a vehicle approaching to within a predetermined distance of the vehicle detection sensor 30 and notifies the master device 100 of vehicle detection information.

The order post 40 includes, for example, a menu board which receives an order from the customer, the microphone 41, and the speaker 42. The customer talks with the store staff and orders a product by use of the microphone 41 and the speaker 42. The microphone 41 converts ambient sound to an electrical signal (an audio signal). The speaker 42 outputs, as audio, the electrical signal which is input to the speaker 42 via the master device 100. The order post 40 is an example of an information input/output apparatus. The order post 40 may turn on the microphone 41 and the speaker 42 when the vehicle detection sensor detects the vehicle 20. This may serve to save energy.

The monitoring camera 50 records an image of surroundings of the monitoring camera 50. The image includes, for example, a visual record, a picture, a movie, and a still picture. The monitoring camera 50 may always record the image and transmit the image to the master device 100 via the switching hub 70. This may enable to monitor the inside and the neighborhood of the store 10. The monitoring camera 50 or the master device 100 may perform prescribed image recognition of the image which is recorded by the monitoring camera 50, and an event may be detected according to a result of the image recognition.

The monitoring camera 50 may link to other sensors such as the vehicle detection sensor 30 and the door opening detection sensor 80 and records the image of the surroundings of the monitoring camera 50. For example, when the vehicle detection sensor 30 which is located in the vicinity of the order post 40 detects the vehicle 20, the monitoring camera 50 which is located in the vicinity of the order post 40 may start recording the image. Such arrangement allows for recording images at predetermined timing, to thereby reduce the size of the recorded images.

The emergency button 60 may be located inside or around the store 10, but the place of installation is not limited to it. The emergency button 60 is pressed, for example, when the store staff or other people think an emergency has arisen, to notify the master device 100 of emergency information which includes that the emergency button is pressed. The emergency button 60 is an example of an actuator which is coupled to the master device 100. However the emergency button 60 may be integrated or not integrated with the master device 100.

The switching hub 70 communicates with a plurality of monitoring cameras 50 and supports data communication between the master device 100 and each of the monitoring cameras 50.

The door opening detection sensor 80 is a publicly known sensor that detects whether the door located in the store 10 is open or closed or an opening state of the door located in the store 10. The door opening detection sensor 80 may be provided at each of the doors or at only particular one or more doors. The door opening detection sensor 80 detects that the door is opened and that a predetermined period of time passes after the door is opened, and then the door opening detection sensor 80 notifies the main device 100 of the door opening information. The delivery port 90 is a place where the store staff hand products to the customer.

In short, the customer in the vehicle 20 talks with the store clerk provided with the slave device 200 in the store 10 and orders the product by use of the microphone 41 and the speaker 42 at the order post 40. The store clerk who receives the order or another store clerk who hears the customer ordering via the slave device 200 prepares the ordered product, for example, in the kitchen and brings the product to the delivery port 90. After having placed an order, the customer in the vehicle 20 moves the vehicle 20 to the delivery port 90 along a lane and receives the ordered product at the delivery port 90.

Figure 2:
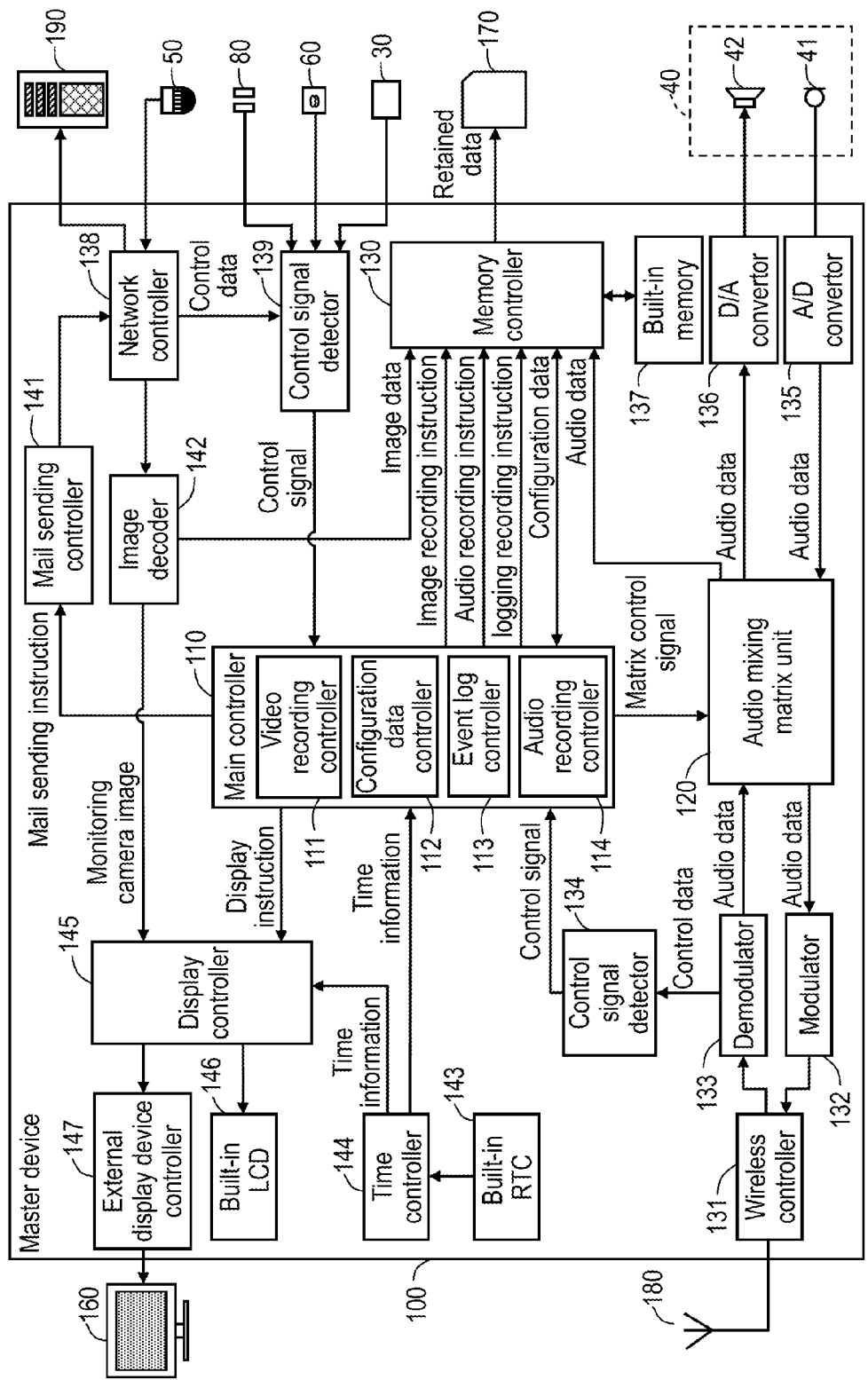
FIG. 2 is a block diagram showing the configuration of a master device according to an embodiment of the present disclosure.

FIG. 2 is a block diagram showing the configuration of a master device.

The master device 100 includes a main controller 110, an audio mixing matrix unit 120, a wireless controller 131, a modulator 132, a demodulator 133, a control signal detector 134, an A/D converter 135, a D/A converter 136, and a built-in memory 137. Also, the master device 100 includes a network controller 138, a control signal detector 139, a mail sending controller 141, an image decoder 142, a built-in RTC (Real Time Clock) 143, and a time controller 144. Furthermore, the master device 100 includes a display controller 145, a built-in LCD 146, and an external display device controller 147.

The master device 100 may include a display 160, an external memory 170, an antenna 180, and an Email server 190. The display 160 and the antenna 180 may be provided in the master device 100.

For example, a CPU of the master device 100 performs various processes of the master device 100, such as various controls, various setups, and various determinations, by retrieving a program and data from an RAM or an ROM and running the program. These processes include a process of the main controller 110, the memory controller 130, the wireless controller 131, the network controller 138, the mail sending controller 141, the display controller 145, and the external display device controller 147.

The main controller 110 includes a video recording controller 111, a configuration data controller 112, an event log controller 113, and an audio recording controller 114.

The main controller 110 transmits, to the audio mixing matrix unit 120, a matrix control signal according to, for example, control information from the control signal detector 134. The matrix control signal controls ON/OFF state of each contact point of a matrix unit 123 (shown in FIG. 5) of the audio mixing matrix unit 120. Therefore, the main controller 110 functions as a connection controller which determines whether each of the connection points is connected or not connected.

The video recording controller 111 transmits, to the memory controller 130, an image recording instruction according to the control information which includes an image recording instruction from the control signal detector 134.

The configuration data controller 112 transmits, for example to the memory controller 130, a configuration data if needed. The configuration data includes various configuration data, which is set by the master device 100, such as network information, schedule information, audio recording configuration information, video recording configuration information, mail sending configuration information, and configuration information for sound pickup or audio output.

For example, an administrator may set the configuration data on a setting screen which is displayed on the display 160 via the actuator (not shown in figures) of the master device 100.

The audio recording configuration information includes configuration information which defines, for example, that audio recording starts when a prescribed event occurs while a talk button 214 of the slave device 200 is pressed, that audio recording starts when a prescribed event occurs while a page button 214 of the slave device 200 is pressed, and that audio recording does not start according to occurrence of events.

The event log controller 113 generates an event log of events which occur at various parts of the master device 100 at prescribed timing and transmits, to the memory controller 130, a logging instruction as necessary. The events includes, for example, an event from outside such as receiving a control signal from the slave device 200, an event occurred inside the master device such as that the main controller 110 sets an operation configuration when the master device 100 receives a control signal.

The audio recording controller 114 transmits, to the memory controller 130, an audio recording instruction according to the control information which includes an audio recording instruction from the main controller 110.

The audio mixing matrix unit 120 receives audio data from the demodulator 133 and outputs the audio data to at least one of the D/C convertor 136 and the memory controller 130 according to the ON/OFF state of each of the contact points in the matrix unit 123.

The audio mixing matrix 120 receives audio data from the A/D convertor 135 and outputs the audio data to at least one of the modulator 132 and the memory controller 130 according to the ON/OFF state of each of the contact points in the matrix unit 123.

The memory controller 130 receives image data from the image decoder 142 and configuration data from the main controller 110. Also, the memory controller 130 receives, for example, the image recording instruction, the audio recording instruction, and the logging instruction. The memory controller 130 generates retained data including the image data, the audio data, the log data according to, for example, the image recording instruction, the audio recording instruction, and the logging instruction. And the memory controller 130 stores the retained data in the built-in memory 137 or the external memory 170. The memory controller 130 may generate a file including the retained data and stores the file in the memory. As described above, the memory controller 130 functions as an audio recorder or an image recorder. Also, the memory controller 130 functions as a file generator which generates a file including the audio recording data according to log information.

The wireless controller 131 controls wireless communication with the slave device 200 via the antenna 180 and the wireless network 150. The wireless controller 131 transmits, to the antenna 180, the data from the modulator 132. The data from the modulator 132 includes audio data. The wireless controller 131 retrieves data which is included in a wireless signal received by the antenna 180 and transmits the data to the demodulator 133. The data from the antenna 180 includes control data and audio data. The wireless controller 131 functions as a receiver which receives data via the antenna 180.

The modulator 132 modulates audio data from the audio mixing matrix unit 120 and transmits the audio data to the wireless controller 131.

The demodulator 133 demodulates the data from the wireless controller 131 and transmits, to the control signal detector 134, the control data of the demodulated data and transmits, to the audio mixing matrix unit 120, the audio data.

The control signal detector 134 receives the control data from the demodulator 133, generates a control signal by converting the control data, and transmits the control signal to the main controller 110.

The main controller 110 receives the control signal from the control signal detector 134 and detects occurrence of an event when the control signal includes prescribed information. For example, the main controller 110 detects a prescribed event if the control data includes information that a prescribed button of the slave device 200 is pressed. The prescribed buttons include an audio record button 213, a talk button 214, and a page button 215. The prescribed events include a video record starting event, a talk event, and a page event. Upon detecting any of the prescribed events, audio recording or video recording, for example, is started. In other words, the main controller 110 functions as an audio recording instruction detector and/or a video recording instruction detector.

The A/D convertor 135 receives an analog audio signal which is acquired by the microphone 41 of the order post 40, converts the analog audio signal to audio data of digital audio signal, and transmits the audio data to the audio mixing matrix unit 120. The A/D convertor 135 functions as an audio data retrieving unit.

The D/A convertor 136 converts the audio data of the digital audio signal from the audio mixing matrix unit 120 to an analog audio signal, and transmits the analog audio signal to the speaker 42 of the order post 40. The D/A convertor 136 functions as an audio output unit.

The built-in memory 137 stores the retained data from the memory controller 130 and transmits the retained data to the memory controller 130. The built-in memory 137 may be a memory which a CPU directly transmits data to/from. The built-in memory 137 may be, for example, ROM (Read Only Memory) and RAM (Random Access Memory).

The network controller 138 controls a network for a wireless communication between the monitoring camera 50 or the Email server 190 and the master device 100. The network may be, for example, wireless LAN, internet, or other networks.

The network controller 138 receives data from the monitoring camera 50, transmits the control data of the received data to the control signal detector 139, and transmits image data of the received data to the image decoder 142. It means the network controller 138 functions as an image retrieving unit.

The network controller 138 receives mail information from the mail sending controller 141 and sends a mail to the Email server 190 according to the mail information. It means the network controller 138 functions as a mail sending unit.

The control signal detector 139 receives prescribed information from, for example, the vehicle detection sensor 30, the emergency button 60, or the door opening detection sensor 80. Also the control signal detector 139 generates the control signal by converting the prescribed information and transmits the control signal to the main controller 110.

The main controller 110 receives the control signal from the control signal detector 139 and detects occurrence of an event when the control signal includes prescribed information. For example, the main controller 110 detects an event of vehicle detection when the control signal includes vehicle detection information. For example, the main controller 110 detects an emergency event when the control signal includes emergency information. For example, the main controller 110 detects a door opening event when the control signal includes door opening information. Image recording or video recording starts according to the detection of an event. That is, the main controller 110 functions as an audio recording instruction detector and a video recording instruction detector.

When the mail sending controller 141 receives a mail sending instruction from the main controller 110, the mail sending controller 141 generates mail information and transmits the mail information to the network controller 138. The mail information includes, for example, mail text, a mail header, and information of mail destination. The mail text may include information on detection of a prescribed event such as a warning event.

The mail information may include an attached file. The attached file may include a file of the retained data such as the audio recording data or the video recording data which is generated by the memory controller 130.

The image decoder 142 decodes the image data from the network controller 138 and transmits, to the display controller 145 and the memory controller 130, the image data which is decoded.

The built-in RTC 143 is, for example, a chip which has a timing function and which is mounted on a circuit board of the master device 100. The built-in RTC 143 may function as a timer.

The time controller 144 retrieves the time information which is obtained by use of the timing function of the built-in RTC 143, and transmits the time information to the main control 110 and the display 145. Also, the time controller 144 checks a condition of timing of the built-in RTC 143. The time controller 144 does time measuring from a defined point of time.

The display controller 145 performs display control of the built-in LCD 146 or the display 160.

The built-in LCD 146 displays various information such as image information and literal information. For example, the built-in LCD 146 shows, to people around the master device 100 such as the store clerk wearing the slave device 200, that the wireless communication system 1000 is in a prescribed state and that the wireless communication system 1000 received a prescribed notice by lighting or blinking a screen or a character on the screen, or turning off the light of the screen or the character on the screen.

The external display device controller 147 performs various control of the display 160.

The display 160 displays various information such as image information and text information. The image information includes, for example, information of image which is recorded by the monitoring camera.

The external memory 170 is a memory which may be connected and/or inserted to the master device 100. The external memory 170 may be a HDD (Hard Disk Drive), a SSD (Solid State Drive), various mediums such as a DVD (Digital Versatile Disc), and a SD card.

Figure 3:
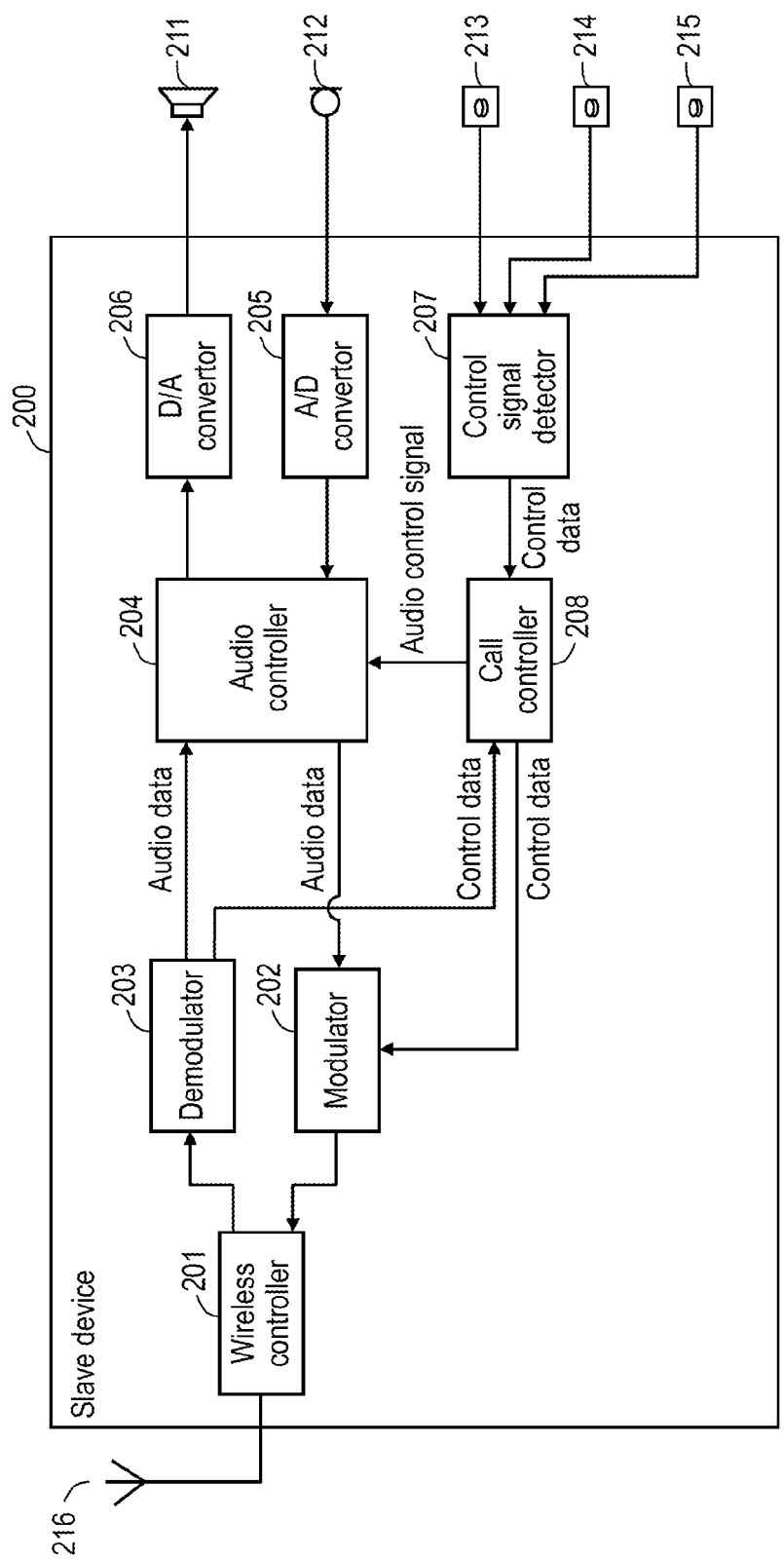
FIG. 3 is a block diagram showing the configuration of a slave device according to an embodiment of the present disclosure.

FIG. 3 is a block diagram showing the configuration of a slave device 200. The slave device 200 includes a wireless controller 201, a modulator 202, a demodulator 203, an audio controller 204, an A/D convertor 205, a D/A convertor 206, a control signal detector 207, and a call controller 208.

The slave device 200 may include a speaker 211, a microphone 212, an audio record button 213, a talk button 214, a page button 215, and an antenna 216. The speaker 211, the microphone 212, the audio record button 213, the talk button 214, the page button 215, and the antenna 216 may be located outside the slave device 200 and connected to the slave device 200.

For example, a CPU of the slave device 200 retrieves a program and data from a RAM or a ROM and performs various processes of the slave device 200, such as various controls, various setups, and various determinations, by running the program. These processes include, for example, a process of the wireless controller 201, the audio controller 204, and the call controller 208.

The wireless controller 201 controls wireless communication with the master device 100 via the antenna 216 and the wireless network 150. The wireless control 201 transmits, to the antenna 216, data from the modulator 202. The data from the modulator 202 includes, for example, control data and audio data. The wireless controller 201 transmits, to the demodulator 203, data which is received by the antenna 216. The data from the antenna 216, for example, includes the control data and the audio data. The wireless controller 201 functions as a transmission unit which transmits data via the antenna 216.

The modulator 202 modulates the audio data from the audio controller 204 and the control data from the call controller 208, and transmits the modulated data to the wireless controller 201.

The demodulator 203 demodulates the data from the wireless controller 201, transmits, to the call controller 208, the control data of the demodulated data, and transmits, to the audio controller 204, the audio data of the demodulated data.

The audio controller 204 receives the audio data from the A/D convertor 205 and outputs, to the modulator 202, the audio data according to an audio control signal from the call control 208. The audio controller 204 receives the audio data from the demodulator 203 and outputs the audio data to the D/A converter 136 according to the audio control signal from the call controller 208.

The A/D converter 205 receives an analog audio signal acquired by the microphone 212, converts the analog audio signal to audio data which is a digital audio signal, and transmits the audio data to the audio controller 204.

The D/A converter 206 converts the audio data which is a digital audio signal from the audio controller 204 to an analog audio signal, and transmits the analog audio signal to the speaker 211.

The control signal detector 207 transmits the control data to the call controller 208 when the control signal detector 207 detects a prescribed operation such as pressing of the audio record button 213, the talk button 214, or the page button 215. The control signal detector 207 detects that a state of each button transits to ON state, but each of the buttons does not need to be pressed. The control information includes information of which button is pressed.

The call controller 208 receives the control data from the demodulator 203 and the control data from the control signal detector 207. The call controller 208 generates audio control signal according to the received control data and transmits the audio control signal to the audio controller 204. The call controller 208 transmits, to the modulator 202, the control data from the control signal detector 207.

For example, the call controller 208 generates the audio control signal which instructs to transmit, to the modulator 202, the audio data from the microphone 212 when the control data from the control signal detector 207 includes information that the talk button 214 or the page button 215 is pressed.

On the other hand, the call controller 208 does not generate the audio control signal which instructs to transmit, to the modulator 202, the audio data from the microphone 212 when the call controller 208 does not receive the control data including information that the talk button 214 or the page button 215 is pressed.

Therefore, the audio data is transmitted from the slave device 200 when the talk button 214 or the page button is pressed, for example.

The speaker 211 outputs the analog audio signal from the D/A converter 206 as a sound. The microphone 212 converts ambient sound to an electrical signal (an audio signal).

The audio record button 213 is for starting to record conversations among a plurality of store staff and between the customer and the store clerk. For example, the master device 100 starts recording when the audio record button 213 is pressed. The master device 100 stops recording after a defined period of time from when the audio record button 213 is pressed. Also, if the audio record button 213 is pressed again within the defined period of time from when the audio record button 213 is firstly pressed, the measurement time is reset. And the master device 100 keeps recording for the defined period of time re-set to start from when the audio record button 213 is pressed again.

For example, if any dispute arises between the store clerk and the customer, a conversation between the store clerk and the customer can be easily recorded immediately after the store clerk presses the audio record button 213. Also, the master device 100 does not stop recording even when the audio record button is pressed again before the defined period of time passes from when the audio record button 213 is firstly pressed. Therefore, it may avoid failing to record a necessary conversation. Not only audio recording but also video recording may be started by pressing of the audio record button 213.

The talk button 214 is for starting a conversation with the customer. For example, the slave device 200 whose button is pressed communicates with the order post 40 when the talk button 214 is pressed. In this case, the microphone 212 and the speaker 211 of the slave device 200, whose talk button 214 is pressed, electrically connect to the microphone 41 and the speaker 42 of the order post 40. Therefore the store clerk wearing the slave device 200 whose button is pressed can talk with the customer.

The page button 215 is for starting a conversation among the store staff each wearing the slave device 200. For example, the slave device 200 whose page button 215 is pressed communicates with all of other slave devices 200 when the page button 215 is pressed (broadcast communication). In this case, the microphone 212 and the speaker 211 of the slave device 200 whose page button 215 is pressed electrically connect to the microphone 212 and the speaker 211 of all of other slave devices 200. On the other hand, the slave device 200 whose page button 215 is pressed does not communicate with the order post 40. Therefore, the store staff can talk to each other but the customer does not listen to the conversation.

The audio record button 213, the talk button 214, and the page button 215 may function as described above. However these functions may be appropriately selected by changing the functions of each of the buttons according to a setting of the master device 100. Also the store staff may talk to not only the customer but also other store staff when the talk button 214 is pressed.

Next is an explanation of a sample outline view of the slave device 200.

Figure 4:
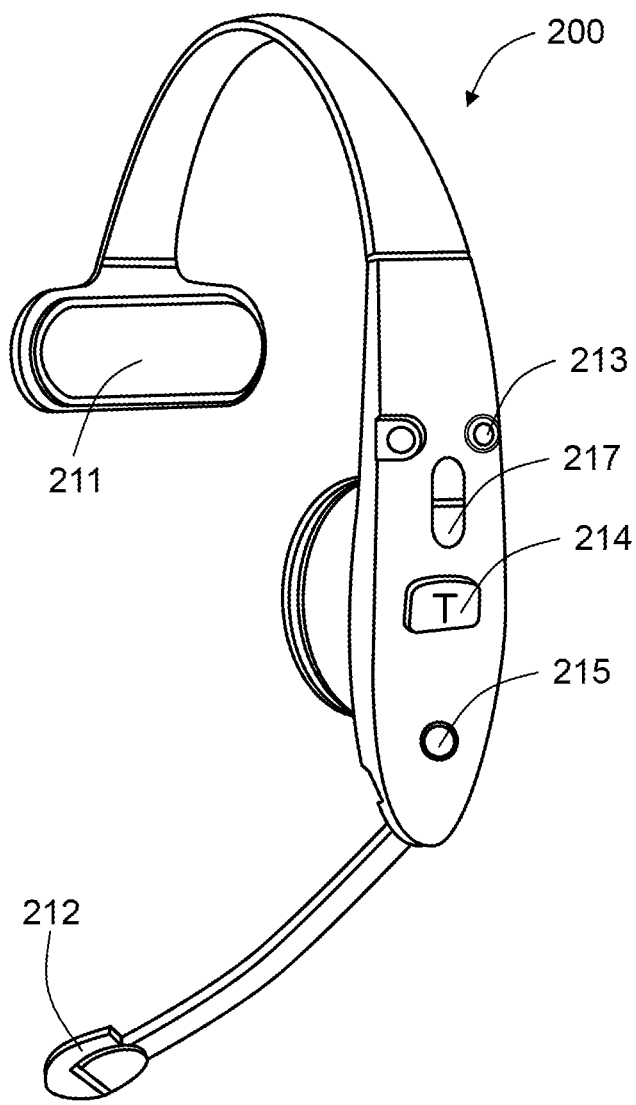
FIG. 4 is an outline view showing the configuration of a slave device according to an embodiment of the present disclosure.

FIG. 4 is an outline view showing the configuration of the slave device 200. In FIG. 4, a headset-type slave device 200 is described. However other configurations such as a configuration which is worn around the hips are applicable. In FIG. 4, the slave device 200 includes the speaker 211, the microphone 212, the audio record button 213, the talk button 214, the page button 215, and volume adjust button 216, for example.

Next is an explanation of a configuration of a recording function of the master device 100.

Figure 5:
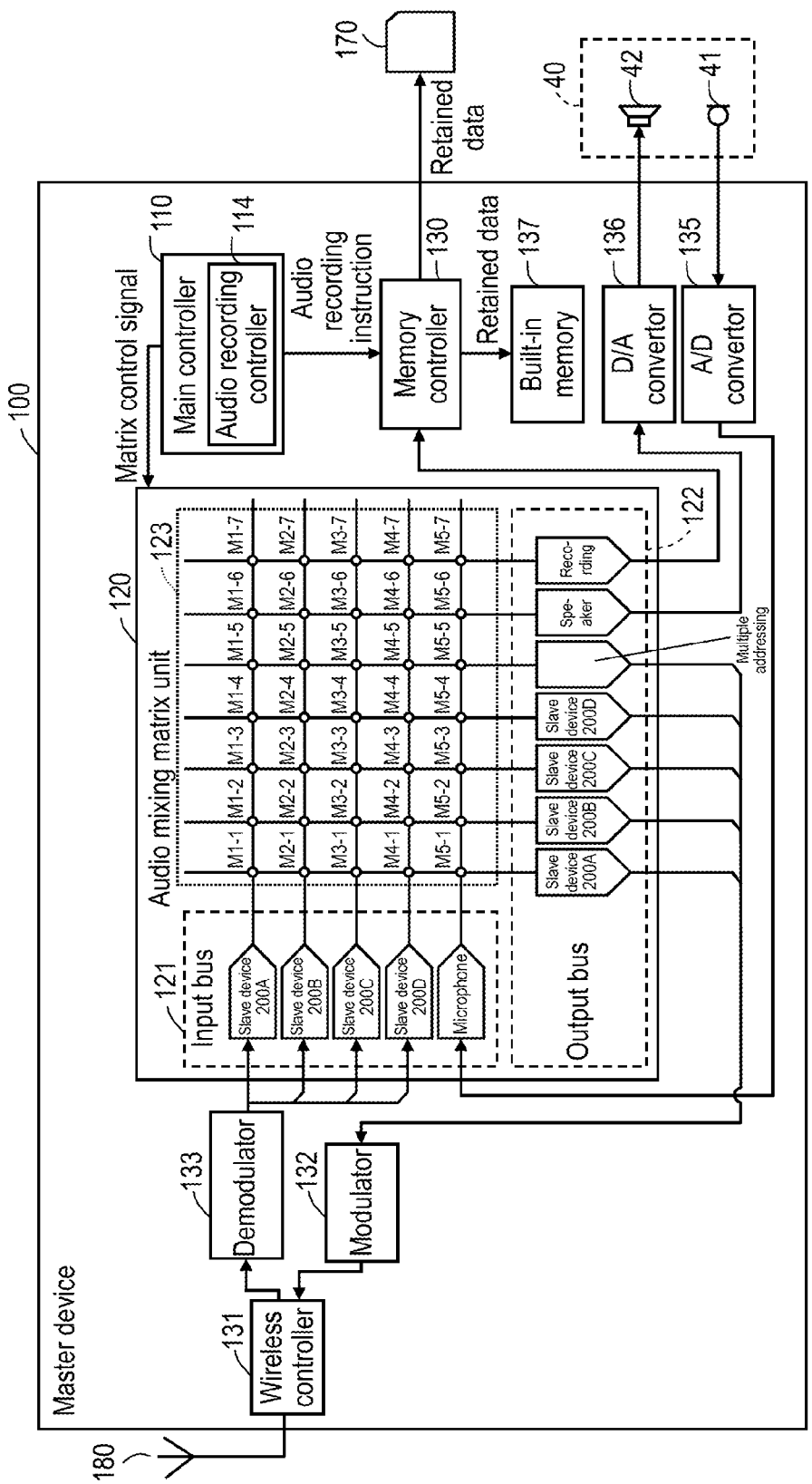
FIG. 5 is a schematic view showing a detailed configuration of an audio mixing matrix unit according to an embodiment of the present disclosure.

FIG. 5 is a schematic view showing a detailed configuration of an audio mixing matrix unit 120. In FIG. 5, the configuration of the recording function of the master device 100 is also described.

The audio mixing matrix unit 120 includes an input bus 121, an output bus 122, and a matrix unit 123.

The input bus 121 includes, for example, an input channel for the store staff and an input channel for the customer. The input channel for the store staff is an input channel for an audio acquired by each microphone 212 of the plurality of slave device 200. The input channel for the customer is an input channel for an audio acquired by the microphone 41 of the order post 40.

The input channel for the store staff includes, for example, an input channel for a slave device 200A, an input channel for a slave device 200B, an input channel for a slave device 200C, and an input channel for a slave device 200D. The number of the input channel for the store staff may be another number.

The output bus 122 includes an output channel for the store staff, an output channel for the customer, an output channel for multiple addressing, and an output channel for recording. The output channel for the store staff is an output channel for an audio output by each speaker 211 of the plurality of slave devices 200. The output channel for the customer is an output channel for an audio output by the speaker 42 of the order post 40.

The output channel for the store staff includes, for example, an output channel for a slave device 200A, an output channel for a slave device 200B, an output channel for a slave device 200C, and an output channel for a slave device 200D. The number of the output channel for the store staff may be another number.

The output channel for the store staff of the output bus 122 is for transmission (unicast transmission) of the audio signal to one of the plurality of slave devices 200. The output channel for multiple addressing is for transmission (broadcast transmission) of the audio signal to all of the plurality of slave devices 200.

The matrix unit 123 includes a plurality of connection points which connects or disconnects one of the input channels of the input bus 121 to or from one of the output channel of the output bus 122. FIG. 5 illustrates that the plurality of connection points are arranged in a matrix fashion. The matrix unit 123 functions as an input/output connection unit.

In FIG. 5, the connection point number is referred to as "Mx-y" by use of an input channel number "x" of the input bus 121 and an output channel number "y" of the output bus 122. For example, the connection point number at the connection point of the input channel of the slave device 200A and the output channel of the slave device 200B is referred to as "M1-2".

When each of the connection points electrically connects (ON), the input channel and the output channel communicate with each other and the audio data is transmitted from the input channel to the output channel. On the other hand, when each of the connection points electrically does not connect (OFF), the input channel and the output channel do not communicate with each other and the audio data is not transmitted from the input channel to the output channel.

Figure 6:
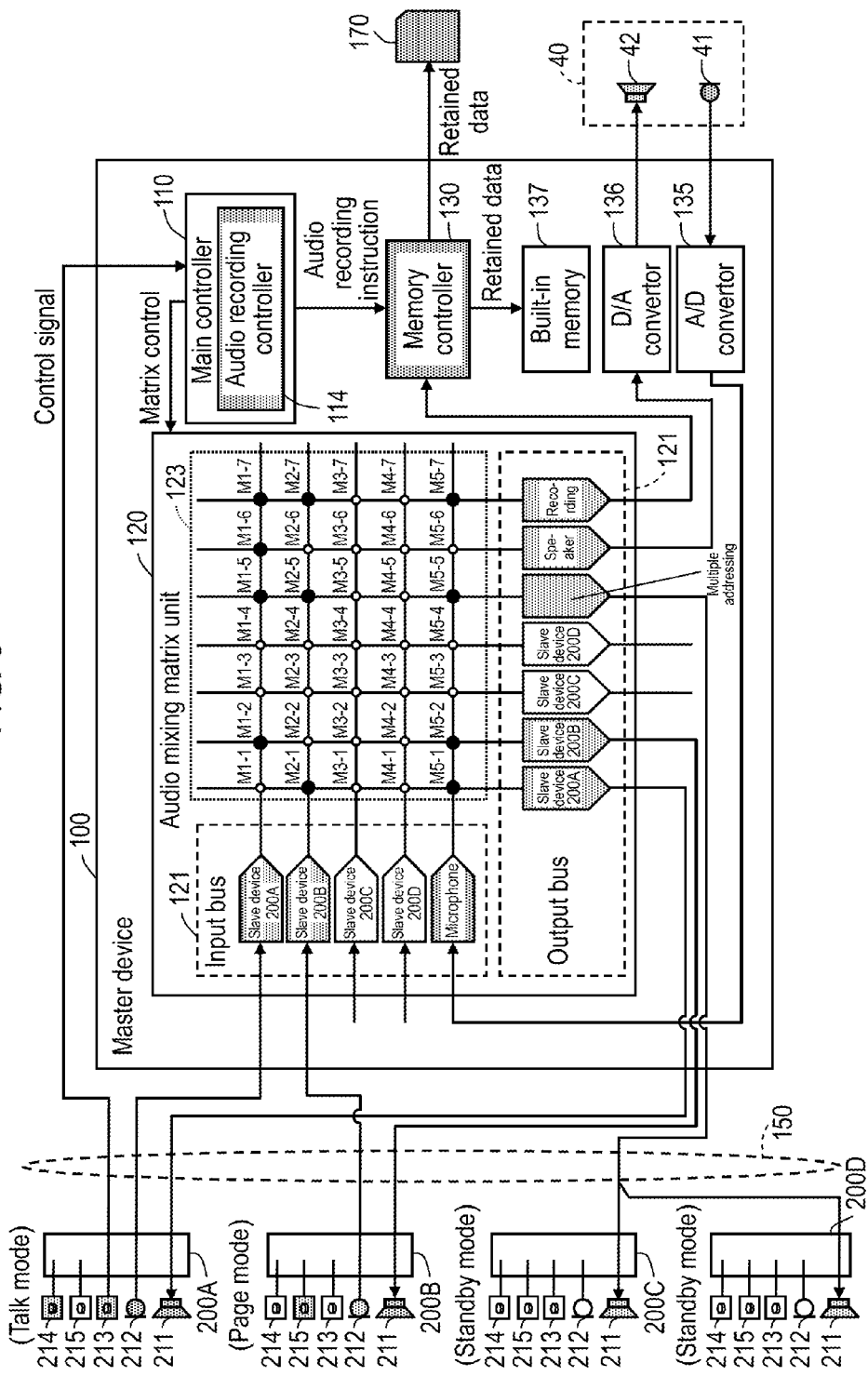
FIG. 6 is a schematic view showing an example of ON/OFF state at each contact point of an audio mixing matrix in a first condition according to an embodiment of the present disclosure.
Figure 7:
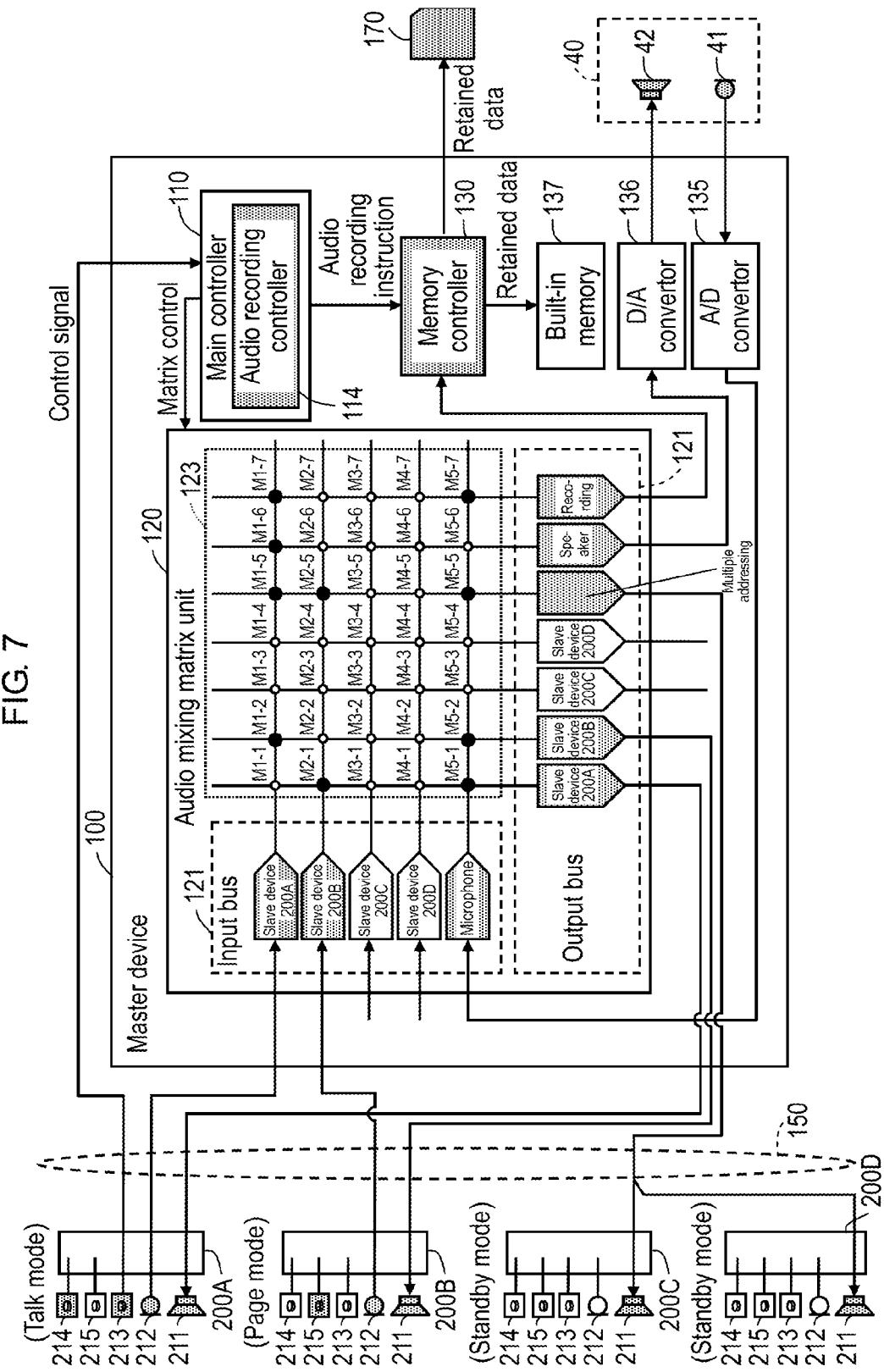
FIG. 7 is a schematic view showing an example of ON/OFF state at each contact point of an audio mixing matrix in a second condition according to an embodiment of the present disclosure.

In FIG. 5-7, a black circle represents the connection point is connected (ON) and a white circle represents the connection point is disconnected (OFF). Therefore, in FIG. 5, all of the connection points are disconnected (OFF). In this case, the audio record button 213, the talk button 214, and the page button 215 of all of the slave devices 200 are turned off (OFF).

When the connection point is connected (ON), it means the operation of the button is available. When the connection point is disconnected (OFF), it means the operation of the button is not available. For example, the button is turned on when the button is pressed. The button is turned off when the button is pressed again or the defined period of time has passed from when the button is pressed.

FIG. 6 is a schematic view showing a first example of ON/OFF state at each contact point of an audio mixing matrix 120.

In FIG. 6, the audio record button 213 and the talk button 214 of the slave device 200A are in ON state and the page button 2115 of the slave device 200A is in OFF state. The page button 215 of the slave device 200B is in ON state and the audio record button 213 and the talk button 214 are in OFF state. Also, the audio record button 213, the talk button 214, and the page button 215 of the slave device 200C and 200D are in OFF state. In FIG. 6, the configuration for recording is set to record audio data from the slave device 200 and the microphone 41 according to the state of the talk button 214 and the page button 215.

Regarding the slave device 200A, the wireless controller 201 transmits, to the master device 100, a wireless signal which includes the control signal and the audio signal via the wireless network 150 when the talk button 214 of the slave device 200A is pressed. The control data includes information that the talk button 214 of the slave device 200A is pressed. The audio data is acquired by the microphone 212 of the slave device 200A.

Regarding the master device 100, the wireless controller 131 receives the wireless signal from the slave device 200A. The control signal detector 134 generates a control signal from the control data which is included in the control data. The main controller 110 detects that the control signal includes information that the talk button 214 of the slave device 200A is pressed. The control signal includes an instruction for starting a call between the slave device 200A and the other slave devices 200B-200D or the order post 40.

The main controller 110 transmits, to the audio mixing matrix unit 120, a matrix control signal which corresponds to the control signal when the main controller 110 receives the information that the talk button 214 of the slave device 200 is pressed. In this case, the control signal includes the instruction for starting a call between the slave device 200A and the other slave devices 200B-200D or the order post 40.

The audio mixing matrix unit 120 chooses the input channel of the slave device 200A and the input channel of the microphone 41 as the input channels in order for the store clerk using the slave device 200A and the customer to talk to each other when the audio mixing matrix unit 120 receives the information that the talk button 214 of the slave device 200A is pressed. The audio mixing matrix unit 120 chooses the output channel of the slave device 200A and the output channel for the speaker 42 as the output channels in order for the store clerk using the slave device 200A and the customer to talk to each other. Also, the audio mixing matrix unit 120 chooses the output channel for multiple addressing as the output channel in order for the store clerk using the slave device 200A and the customer to listen to their conversation.

When the audio data of the slave device 200A is output by the speaker 211 of the slave device 200A, audio howling may occur because of voice of the store clerk using the slave device 200A and audio output from the speaker 211. Therefore, in FIG. 6, the output channel for multiple addressing and the speaker 211 of the slave device 200A are not electrically connected.

Also, the audio mixing matrix unit 120 exclusively chooses the output channel of each slave device of the output bus 112 separately, such as the output channel of one of the slave devices 200A-200D, and the output channel for multiple addressing. The output channel of individual slave device (the output channel of the slave device 200A) or the output channel for multiple addressing may be used in order for the speaker 211 of the slave device 200A to output the audio data from the other device. In this case, the output channel of individual slave device is preferentially selected rather than the output channel for multiple addressing.

In FIG. 6, the audio mixing matrix unit 120 turns on the connection points M1-5, M1-6, M5-1, and M5-5 according to the above channel selection policy. The connection point M1-5 is the connection point between the input channel of the slave device 200A and the output channel of multiple addressing. The connection point M1-6 is the connection point between the input channel of the slave device 200A and the output channel for the speaker 42. The connection point M5-1 is the connection point between the input channel for the microphone 41 and the output channel of the slave channel 200A. The connection point M5-5 is the connection point between the input channel for the microphone 41 and the output channel of multiple addressing.

Therefore, the input channel of the slave device 200A and the output channel of multiple addressing are connected, and the audio data from the demodulator 133 is input to the input channel of the slave device 200A. The input channel of the microphone 41 and the microphone 41 are connected, and the audio data form the A/D converter 135 is input to the input channel of the microphone 41. The output channel of the slave device 200A and the speaker 211 of the slave device 200A are connected, and the speaker 211 of the slave device 200A outputs the audio data from the microphone 41. The output channel of the multiple addressing and the speakers 211 of the slave devices 200B-200D are connected, and the speaker 211 of the slave devices 200B-200D output the audio data from the slave device 200A and the microphone 41. The output channel of the speaker 42 and the speaker 42 are connected, and the speaker 42 outputs the audio data from the slave device 200A.

Regarding the slave device 200B, the wireless controller 201 transmits, to the master device 100, the wireless signal which includes the control data and the audio data via the wireless network 150 when the page button 215 of the slave device 200B is pressed. The control data includes information that the page button 215 of the slave device 200B is pressed. The audio data is acquired by the microphone 212 of the slave device 200B. In this case, the page button 215 is pressed after the talk button 214 is pressed, for example.

In the master device 100, the wireless controller 131 receives the wireless signal from the slave device 200B. The control signal detector 134 generates the control signal from the control data which includes the wireless signal. The main controller 110 detects that the control signal includes information that the page button 215 of the slave device 200B is pressed. The control signal includes the instruction for starting a call between the slave device 200B and the other slave devices 200A, 200C, and 200D.

The main controller 110 transmits, to the audio mixing matrix unit 120, the matrix control signal which corresponds to the control signal when the main controller 110 receives information that the page button 215 of the slave device 200B is pressed. In this case, the control signal includes the instruction for starting a call between the slave device 200B and the other slave devices 200A, 200C, and 200D.

When the audio mixing matrix unit 120 receives information that the page button 215 of the slave device 200B is pressed, the audio mixing matrix unit 120 adds the input channel of the slave device 200B as the input channel and adds the output channel of the slave device 200B as the output channel. Therefore, the store clerk using the slave device 200B can talk with the other store clerks using the other slave devices 200A, 200C, and 200D.

When the audio data of the slave device 200B is output by the speaker 211 of the slave device 200B, audio howling may occur because of voice of the store clerk using the slave device 200B and audio output from the speaker 211. Therefore, the output channel for multiple addressing and the speaker 211 of the slave device 200B are not electrically connected.

The audio mixing matrix unit 120, furthermore, turns on the connection points M1-2, M2-1, and M2-5 according to the above channel selection policy in FIG. 6. The connection point M1-2 is the connection point between the input channel of the slave device 200A and the output channel of the slave device 200B. The connection point M2-1 is the connection point between the input channel of the slave device 200B and the output channel of the slave device 200A. The connection point M2-5 is the connection point between the input channel for the slave device 200B and the output channel of multiple addressing.

Therefore, the input channel of the slave device 200B and the microphone 212 of the slave device 200B are connected, and the audio data from the demodulator 133 is input to the input channel of the slave device 200B. The speaker 211 of the slave device 200A outputs the audio data from the slave device 200 and the microphone 41. The output channel of the slave device 200B and the speaker 211 of the slave device 200B are connected, and the speaker 211 of the slave device 200B outputs the audio data from the slave device 200A and the microphone 41. The output channel of the multiple addressing and the speakers 211 of the slave devices 211C and 200D are connected, and the speaker 211 of the slave devices 200C and 200D output the audio data from the slave devices 200A and 200B and the microphone 41.

Also, in the slave device 200A, the wireless controller 201 transmits, to the master device 100, the wireless signal which includes the control signal via the wireless network 150 when the audio record button 213 of the slave device 200A is pressed. The control data includes information that the audio record button 213 of the slave device 200A is pressed.

In the master device 100, the wireless controller 131 receives the wireless signal from the slave device 200A. The control signal detector 134 generates the control signal from the control data which is included in the wireless signal. The main controller 110 transmits the control signal to the main controller 110 when the main controller 110 detects the information that the audio record button 213 is pressed. The control signal includes a recording instruction to the slave device 200A.

The main controller 110 transmits, to the audio mixing matrix unit 120, a matrix control signal according to the control signal when the main controller 110 receives the information that the audio record button 213 is pressed. In this case, the connection points M1-7, M2-7, and M5-7, which are the connection points between the input channels connected to any of the output channels and the audio record channel, are turned ON because the control signal includes the recording instruction.

The connection point M1-7 is the connection point between the input channel of the slave device 200A and the output channel for recording. The connection point M2-7 is the connection point between the input channel of the slave device 200B and the output channel for recording. The connection point M5-7 is the connection point between the input channel of the microphone 41 and the output channel for recording.

Therefore, the output channel for recording and the memory controller 130 are connected, and the audio data from the slave devices 200A and 200B and the microphone 41 is output to the memory controller 130. Therefore, the built-in memory 137 or the external memory 170 may store the retained data which includes the audio data from the slave devices 200A and 200B and the microphone 41.

In the first example described in FIG. 6, the audio data from the slave devices 200A and 200B and the order post 40 may be recorded according to the configuration for recording and the slave device 200 whose talk button 214 or page button 215 is in ON state. Thus, the conversation between the store clerk and the customer and the conversation among the store staff may be recorded. Also, the customer does not hear the conversation among the store staff. This protects the store's privacy.

FIG. 6 shows the audio data is recorded via one output channel for recording. However a plurality of the output channels may be assigned to each of the slave devices 200A-200D and the microphone 41. This may enable to check the content of the audio data of each person easily because each of the recorded data corresponds to one input channel.

FIG. 6 shows the audio data is output by use of the output channel of multiple addressing when the talk button 214 or the page button 215 is pressed. However, the mail controller 110 may designate each of the output channels of the slave devices 200A-200B separately. This may enable to output only the necessary audio data. Therefore, efficiency may be improved and privacy may be protected.

FIG. 7 is a schematic view showing a second example of ON/OFF state at each contact point of the audio mixing matrix 120.

In FIG. 7, The ON/OFF state of the audio record button 213, the talk button 214, and the page button 215 of the slave devices 200A-200D are the same as in FIG. 6. However, information of the configuration for recording in FIG. 7 is different from that in FIG. 6. In FIG. 7, the configuration for recording is that audio data from the slave device 200 and the microphone 41 is recorded according to the ON/OFF state of the talk button 214 and that audio data from the slave device 200 is not recorded according to the ON/OFF state of the page button 215.

The different point from the first example of FIG. 6 is that the connection point M2-7 of the audio mixing matrix unit 120 of the master device 100 is not in ON state, although the ON/OFF state of each of all buttons of the slave devices 200A-200D is the same as in FIG. 6. In other words, in the first example of FIG. 6, the audio mixing matrix unit 120 records the audio data from the slave device 200B whose page button 215 is pressed. However the audio mixing matrix unit 120 does not record the audio data from the slave device 200B whose page button 215 is pressed in the second example of FIG. 7.

In the second example shown in FIG. 7, the audio data from the slave device 200A and the order post 40 is recorded according to the configuration of recording and the slave device 200 whose talk button 214 or page button 215 is ON state. This may enable to record the audio data of the store clerk using the slave device 200A whose talk button 214 is pressed and the customer. Also the audio data from the store clerk using the slave device 200B whose page button 215 is pressed is not recorded. Also, the customer does not hear the conversation among the store staff. This protects the store's privacy.

Next is an explanation of behavior of the master device 100.

FIG. 8 is a flowchart showing an example of behavior of a main controller.

Firstly, the main controller 110 determines whether a plurality of conditions are met or not (S101). The plurality of conditions include whether the main controller 110 receives the control signal from the control signal detector 134 or the control signal detector 139 or not and whether a trigger for stopping audio or video recording is generated or not.

Here, the flowchart of the control signal relating to audio recording, video recording, and mail sending from the slave device 200 is explained. The control signal, which is just logged, not relating to audio recording, video recording, and mail sending, such as the control signal detected by the vehicle detection sensor 30 to only indicate that the customer comes to the store, is not explained here.

The control signal is received when, for example, a prescribed event occurs to the slave device 200 or external connected devices such as the vehicle detection sensor 30, the emergency button 60, and the door opening detection sensor 80. The trigger for stopping the audio/video recording may be an instruction for stopping the audio recording and the video recording or a fact that the defined period of time has elapsed. The main controller 110 may determine whether the defined period of time has elapsed or not based on the time information notified from the time controller 144 which monitors the built-in RTC 143.

The main controller 110 determines whether a timer is running or not when the main control 110 receives the control signal (S102). The timer is for determining an ending time of the audio/video recording.

When the timer is not running, the main controller 110 reads the configuration data relating to the audio/video recording and the mail sending, from, for example, the built-in memory 137 (S103). The configuration data includes, for example, information of the configuration for audio recording, video recording, and mail sending which is included in the configuration data.

The main controller 110 refers to configuration information of audio recording, which is included in the loaded configuration data. Then the main controller 110 checks the content of the configuration data for recording, such as whether audio and/or video recording is configured (S104).

When video recording is configured, the video recording controller 111 starts recording the image which is taken by the monitoring camera 50 (S105). In this case, the video recording controller 111 of the main controller 110 transmits an instruction for image recording to the memory controller 130. The memory controller 130 records the image from the image decoder 142 into the built-in memory 137 or the external memory 170 according to the instruction for image recording.

The recorded images may be images from all of the monitoring cameras 50 of the wireless communication system 1000. In this case, when the store clerk wearing the slave device 200, which has any pressed button, moves around in the store 10, the store clerk is likely to be in the recorded image. Also, when the door opening detection sensor 80 detects that the door is opened, there may be a suspicious individual in the store 10. When the suspicious individual moves around in the store 10, the suspicious individual is likely to be in the recorded image. Therefore, security of the store 10 may be improved.

Also, the recorded image may be images from at least one of the monitoring cameras 50 of the wireless communication system 1000. For example, when the vehicle detection sensor 30 detects the vehicle, there is likely to be a customer. Then, the image recorded by one or a plurality of monitoring cameras 50 arranged around the order post 40 may be recorded. This may lead to recording a dispute between the staff and the customer during their conversation and the recorded video can be later verified. Therefore, security of the store 10 may be improved. The one or the plurality of monitoring cameras 50 which are recording may be identified by, for example, identification data, such as an IP address and MAC address of the monitoring camera 50.

On the other hand, the video recording controller 111 does not start recording the image which is taken by the monitoring camera 50 when the configuration for recording is a no-recording configuration.

The main controller 110 refers to information of the configuration for audio recording which is included in the loaded configuration data and reads the content of the configuration for audio recording (S106).

When the configuration for audio recording is such as to start recording when the talk button 214 is pressed, the audio recording controller 114 starts recording (talk recording) according to the fact that the talk button 214 is pressed (S107). In this case, the audio recording controller 114 of the main controller 110 transmits, to the memory controller 130, an instruction for audio recording. The memory controller 130 stores the audio data from the audio mixing matrix unit 120 to the built-in memory 137 or the external memory 170 according to the instruction for audio recording.

Whether audio data of the slave device 200 is recorded depends on, for example, which slave device has the pressed talk button 214. The audio data from the microphone 41 may be recorded. For example, the audio data which is to be recorded in FIGS. 6 and 7 is recorded.

When the configuration for audio recording is such as to start recording when the page button 215 is pressed, the audio recording controller 114 of the main controller 110 starts recording (page recording) according to the fact that the page button 214 is pressed (S108). In this case, the audio recording controller 114 of the main controller 110 transmits, to the memory controller 130, an instruction for audio recording. The memory controller 130 stores the audio data from the audio mixing matrix unit 120 to the built-in memory 137 or the external memory 170 according to the instruction for audio recording.

The audio data which is to be recorded of the slave device 200 depends on, for example, which slave device has the pressed page button 215. The audio data from the microphone 41 is not recorded. For example, the audio data which is to be recorded in FIG. 6 is recorded.

When the configuration for audio recording is set so as not to record, the audio recording controller 114 of the main controller 110 does not start recording (S109).

The main controller 110 refers to information of the mail sending configuration which is included in the loaded configuration data and reads the content of the mail sending configuration. For example, the main controller 110 determines whether the mail sending configuration is a configuration for a mail sending (S110).

When the mail sending configuration is such as to send a mail, the mail controller 110 notifies the mail sending instruction to the mail sending controller 141 (S111). The mail sending controller 141 sends a mail to the mail server 190 in order to notify, by mail, the receiver that a prescribed event occurs, via the network controller 138. The recorded audio data and/or the recorded video data may be attached to the mail.

On the other hand, when the mail sending configuration is set so as to not send a mail, the main controller 110 does not notify the mail sending instruction.

The processing order which includes the three configuration process for video recording at S104 and S105, the configuration process for audio recording at S106-S109, and the configuration process for mail sending at S110 and S111 may be changed.

The main controller 110 determines whether the video recording process and/or the audio recording process started or not (S112). That is, for example, the main controller 110 determines whether the main controller 110 implemented any of the process of S105, S107, and S108.

When the main controller 110 starts recording audio and/or recording video, the main controller 110 starts the timer (S113).

The event log controller 113 of the main controller 110 stores the event log (S114). In this case, the event log controller 113 of the main controller 110 transmits a logging instruction to the memory controller 130. The memory controller 130 stores information of the event log to the built-in memory 137 or the external memory 170. In S113, the event log "Rec Start" shown in FIG. 9 is stored, for example.

In S102, the main controller 110 restarts the timer when the timer is running (S115). For example, assuming that the audio recording button 213 is pressed again within the defined period of time (e.g. two minutes) from when the audio recording button 213 of the slave device 200 is initially pressed. In this case, the timer is restarted when the audio recording button 213 is pressed again. Therefore, the audio recording time and/or the video recording time may be extended up to the maximum recording time (e.g. five minutes) if needed.

Generally, the store clerk may not see the audio record button 213 and other buttons when the slave device 200 is a headset. Therefore, if a recording system is such that the store clerk starts and stops recording audio by operating the audio recording button 213, the store clerk may fail to properly record audio by accidentally pressing the audio recording button 213 to stop an on-going recording. However, according to the examples of the present invention as described above, the store clerk may record audio without any difficulty even when the store staff presses the audio record button 213 twice. This is because the audio recording stops only after the defined period of time from when the audio record button 213 is pressed.

The process proceeds from S115 to S114.

In S102, the audio recording controller 114 and/or the video recording controller 111 stop recording when the main controller 110 detects an instruction for stopping the audio recording and/or the video recording or a fact that the defined period of time has elapsed. In this case, the audio recording controller 114 gives an instruction for stopping the audio recording to the memory controller 130. Additionally or alternatively the video recording controller 111 gives an instruction for stopping the video recording to the memory controller 130.

Also, the main controller 110 transmits the matrix control signal to the audio mixing matrix unit 120 when the main controller 110 stops the audio recording. The matrix control signal includes a signal for turning off the connection point between the output channel for recording and the input channel which is to be recorded.

Then the main controller 110 generates an audio record file and/or a video record file (S117). In this case, the audio recording controller 114 and/or the video recording controller 111 give an instruction for creating a file to the memory controller 130. The memory controller 130 creates the audio data and/or the video data from the recording start time to the recording stop time as single file, for example. The memory controller 130 generates the audio record file and/or the video record file according to the event log information stored in S114.

The main controller 110 records data relating to the log information. For example, the main controller 110 may name the audio record file or the video record file using "time and date of the event" as a file name. Also, the main controller 110 may include a link of the file to the event log data. Specially, when the slave device 200 is operated, the main controller 110 generates a file which links to the event log of the slave device 200. Information of the link of the file may be URL (Uniform Resource Locator). URL is an example of address information which enables to access the audio record file.

The process proceeds from S117 to S114.

The processes S101-S114 are iteratively implemented as long as a prescribed iteration condition is satisfied. The prescribed iteration condition may be a maximum number of executions or a time period of execution. The prescribed iteration need not be set. The processes may be iteratively implemented, or not iteratively implemented.

In the above example of behavior on the main controller 110, a dispute between the staff and a customer and other events inside/outside the store 10, such as unexpected situations, are recorded as audio and/or video. This may ensure security. Aldo, the main controller 110 does not always record. This may lead to protect privacy of the customer and/or the store staff.

FIG. 8 shows that the configuration for audio recording is set so as to link to either of the talk button 214 and the page button 215 (S107 and S108). However the configuration for audio recording may be set to link to both of the talk button 214 and the page button 215.

Next is an explanation of the log data format and the audio record file format.

FIG. 9 is a schematic view showing an example of log data and a recorded audio data file.

The log data is a data set which includes event log information of the master device 100. The log data includes, for example, time and date of each event such as years, months, days, hours, minutes, and seconds, and information of the type of each event. The information of type of event may be information relating to the fact that the emergency button 60 is pressed, that audio recording starts, that video recording starts, that audio recording stops, that video recording stops, that the master device 100 receives a warning from the slave device 200 which may be in a handset shape, that a mail is sent, and the configuration of the master device 100 is changed (e.g. the configuration for audio/video recording is changed by a control signal). The time of the event occurrence is the same as the time of the audio recording instruction.

The main controller 110 may refer to time information of the log data and include the time information of the log data to the file name of the audio record file when the main controller 110 generates the audio record file. This is for a user's convenience because, for example, many steps to input the file name by the administrator or the user of the wireless communication system 1000 may be avoided. Also, the log data and the file name are linked to each other because the file name of the audio record file includes at least a part of the log data. This helps a user to compare the log data to the file name and manage files easily.

In FIG. 9, the recorded audio data file is explained as an example, but the above explanation is applicable to the recorded video data.

Next is an explanation of a backup of the wireless communication system 1000.

The configuration data controller 112 of the main controller 110 may back up a system construction (the configuration data) collectively and perform control for restoring. The system construction may include various configuration information of the wireless communication system 1000. The system construction includes, for example, the configuration data of the schedule, the sound environment, and the behavior of the wireless communication system 1000 at the time of event occurrence, such as the time of audio recording, the time of video recording and the time of mail sending. The main controller 110 may back up or restore it in the external memory 170 such as a SD card.

If there are a plurality of stores 10, by backing up and/or restoring the system configuration, the system construction of the store 10 where the wireless network system 1000 is installed is easily duplicated to the wireless communication system of the other store. For example, the operation to change the time, from 10:30 to 11:00, to send to the store staff in the plurality of stores an audio message "check cash registers," which is common in the plurality of stores, is simplified. Also, this simplifies the operation to change a seasonal greeting message, which introduces a recommended product to the customer and is output from the speaker 42 when the new customer is detected, in the plurality of stores together.

Therefore, for example, an owner who runs a plurality of stores may easily change the system configuration of the plurality of stores together. Also, when the master device 100 crashes, the system configuration of the broken master device 100 may be easily restored to a newly installed master device 100 via the external memory 170.

Next is an explanation of the configuration of the wireless communication system 1000.

FIG. 1 shows the wireless communication system 1000 including the one master device 100 and the plurality of slave devices 200. However the wireless communication system may include a plurality of master devices and the plurality of slave devices. In this case, the plurality of master devices 100 may link to the one slave device 200.

In this wireless communication system, the slave device 200 registers the plurality of master devices 100. Registration information of the plurality of master devices may be stored in a memory of the slave device 200. The memory of the slave device 200 is not shown in figures. The registration information may include identification data of the master device 100 such as DECT ID, IP address, and MAC address. The slave device 200 may detect a prescribed operation, which may be that a search button is pressed, by use of an actuator of the slave device 200. The actuator of the slave device 200 is not shown in figures. Then the slave device 200 refers to the registration information of the master device 100 and searches in the closest master device 100 to the slave device 200 among the master devices 100. The closest master device 100 may be the master device 100 whose reception level detected by the slave device 200 is the highest.

This may lead to establishing a communication session with the searched master device 100 without deleting the registration information of a pre-registered master device 100. Therefore, when the slave device 200, which was used at the store A, is used at the store B, the slave device 200 may be continuously used easily without having to perform a particular registering operation of the master device 100 while moving between the stores. For example, the slave device 200 of the other store may be used without having to shut down the wireless communication system at the store, which is open 24 hours a day.

Therefore, for example, when the slave device 200 is moved from an original store to another store because another slave device 200 used in the other store is broken or the number of customers temporarily increase in the other store, the slave device 200 may be used easily in the other store. Also, when the slave device 200 is returned to the original store, there is no need to perform a particular registration operation of the slave device 200 with the master device 100. Therefore, this is helpful for the store operation.

Next is an explanation of the way that the slave device 200 registers the master device 100 in the wireless communication system 1000.

In the wireless communication system 1000, information of the slave device 200 such as an IP address and MAC address is registered to the master device 100 in advance. The information of the slave device 200 is stored in, for example, the built-in memory 137 or the external memory 170. In this case, the information of the slave device 200 is registered through a wired or wireless communication between the master device 100 and the slave device 200. The information of the slave device 200 may be registered (paired) to the master device 100 from a remote place via a network.

Therefore, when the slave device is broken and has to be replaced by the new one, a dealer may register the slave device 200 to the master device 100 in a warehouse where the new slave device 200 is stored via the network. The dealer does not need to visit the store 10 to register the new slave device 200. Also, the safety of the registration operation may be enhanced because a particular reliable worker may register the slave device 200 to the master device 100.

Therefore, for example, information of the brand-new slave device 200 is registered in the master device 100 and the registration information of the master device 100 is stored in the memory of the brand-new slave device 200 by use of an actuator (not shown in the figures). The delivery agent may delivery the brand-new slave device 200 to the store 10. In the store 10, when a store clerk turns on the brand-new slave device 100, the brand-new slave device 200 is activated as the slave device of the master device 100. Therefore, the slave device 200 does not need to be registered in the store 10. The brand-new slave device 200 is available immediately after the delivery of the brand-new slave device 200.

The intercom system of JP-A-2012-124546, JP-A-2013-137755, and WO2011/102141 does not include a function to record a conversation among a plurality of wireless slave devices. Also, if the conversation among the plurality of wireless slave devices is always recorded by use of an analog terminal of the master device 100, the amount of recoded data becomes rather large. Therefore, effective use of the memory is difficult and privacy is no well protected. Furthermore, if all conversation is always recorded, extracting the conversation of a specific time period among the plurality of wireless slave devices becomes difficult.

On the other hand, the master device 100 records audio and/or video when an event occurs (e.g. the button of the slave device 200 is pressed or the sensor detection). This may lead to protecting privacy and to ensuring security. Also, this may lead to reducing the amount of recoded data and to using the memory effectively compared to when the master device 100 always records audio and/or video. Also, the log information which the master device 100 retrieves at a specific time is linked to the audio data file. This may lead to managing the files easily and to checking the content of the recorded audio easily.

The slave device 200 may be easy to operate for communicating with the other slave devices and the order post 40, and for instructing to record audio. This may lead to enhancing the user's convenience.

The wireless communication system 1000 records audio and/or video when an event occurs (e.g. the button of the slave device 200 is pressed or the sensor detection). This may lead to protecting privacy and to ensuring security. Also, this may lead to reducing the amount of recoded data and to using the memory effectively compared to when the master device 100 always records audio and/or video. Also, the log information which the master device 100 retrieves at a specific time is linked to the audio data file. This may lead to managing the files easily and to checking the content of the recorded audio easily.

This invention is not limited to the above construction of the embodiment.

For example, in the above embodiment, the wireless communication system 1000 is provided in one store 100. However the wireless communication system 1000 may be provided in a plurality of stores 10. Also, the wireless communication system 1000 may be connected to the public telephone network and at least a part of communication lines of the wireless communication system 1000 may be a public line.

As another example, an image mixing matrix unit may be used, which is comparable to the audio mixing matrix unit 120, to process images taken by the monitoring camera(s) 50 according to a defined processing policy. This may lead to efficiently using the images taken by the monitoring camera(s) 50.

In the above embodiment, generally, the main controller 110 records the audio data according to the configuration data. However, without recording audio, the main controller 110 may record only the image taken by the monitoring camera 50 or send an email. The main controller 110 performs at least one of the audio recording, video recording and email sending.

When the master device 100 records a video, the slave device 200 may have a video record button which, when actuates, triggers video recording, or the master device 100 may detect an instruction for video recording.

In the above embodiment, the audio record button 213 is pressed after the talk button 214 or the page button 215 of the slave device 200 is pressed. However the audio record button 213 may be pressed before the page button 215 of the slave device 200 is pressed. Once the audio record button 213 is pressed, a speaker of other devices may output audio.

In the above embodiment, the mail sending controller 141 may generate mail text or a mail title according to the log information.

The present application is based on Japanese Patent Application No. 2013-152769 filed on Jul. 23, 2013, the contents of which are incorporated herein by reference.

What is claimed is:

1. A wireless communication apparatus which communicates with a first microphone and a wireless communicator having a second microphone, comprising:
    an audio processor which acquires audio data from the first microphone;
    a controller which detects an instruction for recording the audio data, the instruction for recording the audio data being generated by the wireless communicator;
    an audio recorder which starts recording the audio data from the first microphone acquired by the audio processor according to the instruction for recording the audio data and stops the recording after a defined period of time since detection of the instruction for recording the audio data;
    a timer which starts measuring time when the audio recorder starts the recording for the defined period of time; and
    a memory controller which creates a recorded audio file including the audio data recorded by the audio recorder, the recorded audio file being linked to log information of communication between the wireless communication apparatus and the first microphone.

2. The wireless communication apparatus according to claim 1, wherein
    the memory controller assigns a name to the recorded audio file that includes time information of the instruction for recording the audio data.

3. The wireless communication apparatus according to claim 1, wherein
    the log information includes address information used to access the recorded audio file.

4. The wireless communication apparatus according to claim 1, wherein
    when the controller detects another instruction for recording the audio data within the defined period of time since detection of the instruction for recording the audio data, the audio recorder stops the recording after the defined period of time since detection of the another instruction for recording the audio data.

5. The wireless communication apparatus according to claim 1, wherein
    the controller detects the instruction for recording the audio data when the controller detects an occurrence of a defined event.

6. The wireless communication apparatus according to claim 5, wherein the defined event is operation of an actuator.

7. The wireless communication apparatus according to claim 1, further comprising a memory in which the recorded audio file is stored.

8. The wireless communication apparatus according to claim 1, further comprising:
    an image processor which acquires image data taken by an imager;
    a second controller which detects an instruction for recording the image data;
    an image recorder which starts recording the image data from the imager acquired by the image processor according to the instruction for recording the image data and stops recording the image data after a second defined period of time since detection of the instruction for recording the image data;
    a second timer which starts measuring time when the image recorder starts recording the image data for the second defined period of time; and
    a second memory controller which creates a recorded image file including the image data recorded by the image recorder, the recorded image file being linked to log information of communication between the wireless communication apparatus and the imager.

9. The wireless communication apparatus according to claim 8, wherein the second defined period of time for image recording is the same as the defined period of time for audio recording.

10. The wireless communication apparatus according to claim 8, wherein the instruction for recording the audio data serves additionally as the instruction for recording the image data, the controller that serves additionally as the second controller detects the instruction for recording the audio data as an instruction for both recording the audio data and the image data, the second defined period of time for imaging recording is the same as the defined period of time for audio recording, and the timer serves additionally as the second timer to measure the defined period of time and the second defined period time that are the same.

11. The wireless communication apparatus according to claim 1, wherein the audio processor is an audio matrix unit.

12. A system comprising a wireless communication apparatus, a wireless communicator, and a first microphone, wherein
    the wireless communicator includes:
        a second microphone;
        an actuator which, when activated, instructs a start of audio recording; and
        a transmitter which transmits control data including information that the actuator is activated to instruct the start of the audio recording; and
    the wireless communication apparatus includes:
        an audio processor which acquires audio data from the first microphone;
        a receiver which receives the control data from the wireless communicator;
        a controller which detects an instruction for recording the audio data according to the control data;
        an audio recorder which starts recording the audio data from the first microphone acquired by the audio processor according to the instruction for recording the audio data and stops recording the audio data after a defined period of time since detection of the instruction for recording the audio data;
        a timer which starts measuring time when the audio recorder starts recording the audio data for the defined period of time; and
        a memory controller which creates a recorded audio file including the audio data recorded by the audio recorder, the recorded audio file being linked to log information of communication between the wireless communication apparatus and the wireless communicator of the first microphone.

13. The system according to claim 12, further comprising a second wireless communicator coupled to a third microphone; wherein the audio recorder of the wireless communication apparatus selectively records one of first audio data from the first microphone and second audio data from the third microphone.

14. The system according to claim 12, further comprising a second wireless communicator coupled to a third microphone; wherein
the audio recorder of the wireless communication apparatus uses different audio recording channels to record first audio data from the first microphone and second audio data from the third microphone, respectively.

15. The system according to claim 12, wherein
the wireless communicator is a headset.

16. A data processing method of operating a wireless communication apparatus which communicates with a first microphone and a wireless communicator having a second microphone, the method comprising:
acquiring audio data from the first microphone;
detecting an instruction, from the wireless communicator, for recording the audio data;
starting recording the audio data from the first microphone according to the instruction for recording the audio data;
stopping recording the audio data after a defined period of time since detection of the instruction for recording the audio data; and
creating a recorded audio file including the recorded audio data, the recorded audio file being linked to log information of communication between the wireless communication apparatus and the first microphone.

17. The data processing method according to claim 16, further comprising:
detecting another instruction for recording the audio data within the defined period of time since detection of the instruction for recording the audio data; and
stopping recording the audio data after the defined period of time since detection of the another instruction for recording the audio data.

18. The data processing method according to claim 16, wherein
detecting the instruction for recording the audio data includes detecting operation of an actuator.

19. The data processing method according to claim 16, further comprising:
acquiring image data from an imager;
detecting an instruction for recording the image data;
starting recording the image data from the imager according to the instruction for recording the image data;
stopping recording the image data after another defined period of time since detection of the instruction for recording the image data; and
creating a recorded image file including the recorded image data, the recorded image data file being linked to log information of communication between the wireless communication apparatus and the imager.

20. The data processing method according to claim 16, further comprising:
acquiring second audio data from a third microphone;
detecting a second instruction for audio recording from the third microphone;
starting recording the second audio data from the third microphone according to the second instruction for audio recording;
stopping recording the second audio data after a second defined period of time since detection of the second instruction for audio recording; and
creating a second recorded audio file including the recorded second audio data, the second recorded audio file being linked to log information of communication between the wireless communication apparatus and the third microphone.

* * * * *